US008752106B2

(12) United States Patent
Renkis

(10) Patent No.: US 8,752,106 B2
(45) Date of Patent: Jun. 10, 2014

(54) MESH NETWORKED VIDEO AND SENSOR SURVEILLANCE SYSTEM AND METHOD FOR WIRELESS MESH NETWORKED SENSORS

(75) Inventor: Martin A. Renkis, Nashville, TN (US)

(73) Assignee: Smartvue Corporation, Nashville, TN (US)

(*) Notice: Subject to any disclaimer, the term of this patent is extended or adjusted under 35 U.S.C. 154(b) by 924 days.

(21) Appl. No.: 11/247,421

(22) Filed: Oct. 11, 2005

(65) Prior Publication Data
US 2006/0064477 A1    Mar. 23, 2006

Related U.S. Application Data

(63) Continuation-in-part of application No. 10/948,501, filed on Sep. 23, 2004, now Pat. No. 7,821,533, and a continuation-in-part of application No. 10/949,487, filed on Sep. 24, 2004, now Pat. No. 7,508,418, and a continuation-in-part of application No. 10/949,609, filed on Sep. 24, 2004, now Pat. No. 7,719,567, and a continuation-in-part of application No. 10/950,033, filed on Sep. 24, 2004, now Pat. No. 7,954,129, and a continuation-in-part of application No. 10/949,489, filed on Sep. 24, 2004, now Pat. No. 8,208,019, and a continuation-in-part of application No. 10/949,776, filed on Sep. 25, 2004, now Pat. No. 7,936,370, and a continuation-in-part of application No. 10/955,552, filed on Sep. 30, 2004, now abandoned, and a continuation-in-part of application No. 10/955,825, filed on Sep. 30, 2004, now Pat. No. 8,253,796, and a continuation-in-part of application No. 10/955,711, filed on Sep. 30, 2004, now Pat. No. 7,728,871, and a continuation-in-part of application No. 10/955,444, filed on Sep. 30, 2004, now Pat. No. 7,784,080, and a continuation-in-part of application No. 10/955,824, filed on Sep. 30, 2004, now Pat. No. 8,199,195, and a continuation-in-part of application No. 10/977,762, filed on Oct. 29, 2004.

(51) Int. Cl.
*H04N 7/173*    (2011.01)

(52) U.S. Cl.
USPC ........... 725/105; 725/114; 725/117; 725/148; 725/118; 348/158; 348/143; 348/155; 348/161; 348/14.03; 348/14.02; 348/14.05

(58) Field of Classification Search
USPC .......... 725/105, 114, 117, 148, 118; 348/158, 348/143, 155, 161, 14.03, 14.02, 14.05
See application file for complete search history.

(56) References Cited

U.S. PATENT DOCUMENTS

| 4,699,484 A | 10/1987 | Howell et al. |
| 4,771,305 A | 9/1988 | Potoroka |

(Continued)

OTHER PUBLICATIONS

Fleck, B, 802.11 Security, O'Reilly Publishing, Dec. 2002, Section 1.5 and 1.5.1.

*Primary Examiner* — Shawn An
(74) *Attorney, Agent, or Firm* — Triangle Patents, PLLC

(57) ABSTRACT

A mesh network sensor and video surveillance system and method for providing communication between a base system having at least one wireless sensor capture device SCD and other SCD(s) and at least one input capture device ICD and other ICD(s), wherein the SCD(s) are capable of smart cross-communication with each other and with the ICD(s) and where the where the ICD(s) are capable of smart cross-communication with each other and offer remote access to their inputs and the SCD(s) inputs via a server computer, including the steps of providing this base system; at least one user accessing the ICD and SCD inputs remotely via a user interface through a remote server computer and/or electronic device communicating with it, for providing a secure sensor surveillance system with extended inputs range and wireless smart cross-communication for monitoring a target environment.

18 Claims, 9 Drawing Sheets

(56) References Cited

U.S. PATENT DOCUMENTS

| | | |
|---|---|---|
| 5,086,385 A | 2/1992 | Launey et al. |
| 5,257,007 A | 10/1993 | Steil et al. |
| 5,485,964 A | 1/1996 | Booth et al. |
| 5,584,576 A | 12/1996 | Wei Hong |
| 5,653,412 A | 8/1997 | Martorano et al. |
| 5,673,022 A | 9/1997 | Patel |
| 5,697,099 A | 12/1997 | Siska et al. |
| 6,122,678 A | 9/2000 | Eckel et al. |
| 6,249,223 B1 | 6/2001 | Christensen |
| 6,310,571 B1 | 10/2001 | Yang et al. |
| 6,335,742 B1 | 1/2002 | Takemoto |
| 6,380,880 B1 | 4/2002 | Bidermann |
| 6,452,152 B1 | 9/2002 | Yang |
| 6,498,336 B1 | 12/2002 | Tian et al. |
| 6,498,576 B1 | 12/2002 | Tian et al. |
| 6,507,083 B1 | 1/2003 | Tian |
| 6,518,909 B1 | 2/2003 | Yang et al. |
| 6,526,225 B1 | 2/2003 | Windrem et al. |
| 6,542,189 B1 | 4/2003 | Tian |
| 6,545,228 B2 | 4/2003 | Hashimoto |
| 6,545,258 B2 | 4/2003 | Tian et al. |
| 6,552,746 B1 | 4/2003 | Yang et al. |
| 6,591,474 B2 | 7/2003 | Soloway et al. |
| 6,665,012 B1 | 12/2003 | Yang |
| 6,680,748 B1 | 1/2004 | Monti |
| 6,693,575 B1 | 2/2004 | Yang et al. |
| 6,697,103 B1 | 2/2004 | Fernandez et al. |
| 6,697,104 B1 | 2/2004 | Yakobi et al. |
| 6,703,939 B2 | 3/2004 | Lehrman et al. |
| 6,726,103 B1 | 4/2004 | Motta et al. |
| 6,737,626 B1 | 5/2004 | Bidermann et al. |
| 6,763,231 B2 * | 7/2004 | Takatori et al. ............... 455/420 |
| 6,765,619 B1 | 7/2004 | Deng et al. |
| 6,778,237 B2 | 8/2004 | Arakawa et al. |
| 6,788,237 B1 | 9/2004 | Bidermann et al. |
| 6,791,611 B2 | 9/2004 | Yang |
| 6,830,387 B2 | 12/2004 | Rife |
| 6,831,699 B2 * | 12/2004 | Chang et al. .................. 348/373 |
| 6,970,183 B1 | 11/2005 | Monroe |
| 7,019,644 B2 | 3/2006 | Barrie |
| 7,020,701 B1 | 3/2006 | Gelvin et al. |
| 7,092,369 B2 * | 8/2006 | Fuccello et al. ............... 370/328 |
| 7,148,803 B2 * | 12/2006 | Bandy et al. ............. 340/539.16 |
| 7,239,236 B1 | 7/2007 | Britton |
| 7,403,220 B2 | 7/2008 | MacIntosh et al. |
| 7,886,010 B1 | 2/2011 | Shankar |
| 7,899,887 B2 | 3/2011 | Conn |
| 7,920,528 B2 | 4/2011 | Karaoguz |
| 2001/0040805 A1 | 11/2001 | Lansing et al. |
| 2001/0042114 A1 | 11/2001 | Agraharam et al. |
| 2001/0056479 A1 | 12/2001 | Miyayama et al. |
| 2002/0024812 A1 | 2/2002 | Agro |
| 2002/0026636 A1 | 2/2002 | LeComte |
| 2002/0100052 A1 | 7/2002 | Daniels |
| 2002/0186180 A1 | 12/2002 | Duda |
| 2002/0188955 A1 | 12/2002 | Thompson et al. |
| 2003/0023614 A1 | 1/2003 | Newstrom |
| 2003/0034387 A1 | 2/2003 | Knowles et al. |
| 2003/0112335 A1 | 6/2003 | Strandwitz |
| 2003/0137426 A1 | 7/2003 | Anthony et al. |
| 2003/0188320 A1 | 10/2003 | Shing |
| 2003/0189638 A1 | 10/2003 | Fry |
| 2003/0210340 A1 * | 11/2003 | Frederick Romanowich ................ 348/272 |
| 2004/0002792 A1 | 1/2004 | Hoffknecht |
| 2004/0008255 A1 | 1/2004 | Lewellen |
| 2004/0021778 A1 | 2/2004 | Oldani et al. |
| 2004/0075547 A1 | 4/2004 | Vojtech et al. |
| 2004/0105006 A1 | 6/2004 | Lazo et al. |
| 2004/0113778 A1 | 6/2004 | Script et al. |
| 2004/0122633 A1 | 6/2004 | Bang et al. |
| 2004/0136388 A1 | 7/2004 | Schaff |
| 2004/0165546 A1 | 8/2004 | Roskind |
| 2004/0168194 A1 | 8/2004 | Hughes |
| 2004/0246128 A1 | 12/2004 | Menard |
| 2005/0012829 A1 * | 1/2005 | Tashiro et al. ........... 348/231.99 |
| 2006/0176834 A1 | 8/2006 | Dickerson et al. |
| 2007/0075857 A1 | 4/2007 | Chang |
| 2011/0169634 A1 | 7/2011 | Raj |

\* cited by examiner

MESH NETWORKED VIDEO AND SENSOR SURVEILLANCE SYSTEM AND METHOD FOR WIRELESS MESH NETWORKED SENSORS

CROSS-REFERENCE TO RELATED APPLICATIONS

This non-provisional utility patent application is related to one or more prior filed non-provisional applications as a continuation-in-part:

U.S. application Ser. No. 10/948,501, entitled "Wireless Video Surveillance System and Method With Two-Way Locking of Input Capture Devices," filed on Sep. 23, 2004 now U.S. Pat. No. 7,821,533.

U.S. application Ser. No. 10/949,487 entitled "Wireless Video Surveillance System & Method with DVR-Based Querying," filed on Sep. 24, 2004 now U.S. Pat. No. 7,508,418.

U.S. application Ser. No. 10/949,609 entitled "Wireless Video Surveillance System and Method with Emergency Video Access," filed on. Sep. 24, 2004 now U.S. Pat. No. 7,719,567.

U.S. application Ser. No. 10/950,033 entitled "Wireless Video Surveillance System and Method with Remote Viewing," filed on. Sep. 24, 2004 now U.S. Pat. No. 7,954,129.

U.S. application Ser. No. 10/949,489 entitled "Wireless Video Surveillance System and Method with External Removable Recording," filed on. Sep. 24, 2004 now U.S. Pat. No. 8,208,019.

U.S. application Ser. No. 10/949,776 entitled "Wireless Video Surveillance System and Method with Dual Encoding," filed on. Sep. 25, 2004 now U.S. Pat. No. 7,936,370.

U.S. application Ser. No. 10/955,552 entitled "Wireless Video Surveillance System & Method with Digital Input Recorder Interface and Setup," filed on Sep. 30, 2004 now abandoned.

U.S. application Ser. No. 10/955,825 entitled "Wireless Video Surveillance System & Method with Rapid Installation," filed on Sep. 30, 2004 now U.S. Pat. No. 8,253,796.

U.S. application Ser. No. 10/955,711 entitled "Wireless Video Surveillance System & Method with Input Capture and Data Transmission Prioritization and Adjustment," filed on Sep. 30, 2004 now U.S. Pat. No. 7,728,871.

U.S. application Ser. No. 10/955,444 entitled "Wireless Video Surveillance System and Method with Single Click-select Actions," filed on Sep. 30, 2004 now U.S. Pat. No. 7,784,080.

U.S. application Ser. No. 10/955,824 entitled "Wireless Video Surveillance System and Method with Security Key," filed on Sep. 30, 2004 now U.S. Pat. No. 8,199,195.

U.S. application Ser. No. 10/977,762 entitled "Wireless Video Surveillance System and Method for Mesh Networking," filed on Oct. 29, 2004.

FIELD OF THE INVENTION

The present invention relates generally to surveillance and sensor technology and equipment and, more particularly, to a wireless video surveillance system and methods associated therewith.

BACKGROUND OF THE INVENTION

While video surveillance systems have existed in the prior art, typically they are wired devices that are difficult, time-consuming, and costly to install and operate. Also, generally, they do not provide for wireless systems that are secure from wireless interception or Internet enabled interception and permit remote user access for viewing, reviewing stored information, and controlling the system's components, in particular via Internet connection to a remote controller computer or cellular phone or other Internet connected device. In addition, they do not provide for methods of tracking assets and other sensor related data other than through visual recording. Thus, there remains a need in the art for a wireless surveillance system and methods of operating same, providing simple setup and controls for high quality input capture by surveillance input capture devices (ICD), including but not limited to video inputs, sensor capture device (SCD), including but not limited to radio frequency identification input, and digital input recorder device(s) (DIR) associated with the ICDs and the SCDs, the DIRs data transfer, storage, and control, including systems and methods providing for managing and reporting on SCD data, remote viewing and controls of the ICDs, SCDs, and DIRs via a remote server computer (RSC) and/or Internet access through the RSC.

SUMMARY OF THE INVENTION

The present invention is directed to a wireless surveillance system and methods of operating same, providing simple setup and controls for high quality input capture by surveillance input capture devices (ICDs) and sensor capture devices (SCDs), that are capable of cross-communication with each other, including but not limited to video inputs, radio frequency identification inputs (RFID), and digital input recorder device(s) (DIR) associated with the ICDs and SCDs, the DIRs data transfer, storage, and control. More particularly, the present invention is directed toward a method for controlling communication between ICD(s), SCD(s) and corresponding DIR. The present invention is further directed toward systems and methods providing for remote viewing and controls of the ICDs, SCDs, and DIRs via a remote server computer (RSC) and/or Internet access through the RSC, the systems and methods having controllable communication between the ICD(s) and corresponding DIR.

In a preferred embodiment, there is at least one SCD associated with a corresponding ICD which is associated with a corresponding DIR for providing a system for capturing inputs of a target environment via the at least one SCD and transferring those inputs via two-way controllable wireless communication with the ICD which in turn is transferring those inputs plus its own inputs via two-way controllable wireless communication with the DIR for electronic, digital storage and remote access thereof. In another preferred embodiment, the system further includes an RSC, which is directly or Internet-remotely accessed by at least one authorized user of the system, when control settings permit. Such controllable remote access includes user viewing of captured inputs of the target environment, including live and/or historical/recorded data, storing, editing, retrieving or otherwise reviewing said inputs, and controlling the system settings and activities, and combinations thereof.

The present invention is further directed to a method for installing and operating the system and various embodiments and combinations thereof.

Thus, the present invention provides systems and methods for wireless image-based or video and sensor surveillance of predetermined environments, in particular with remote access and controls of the system components.

Accordingly, one aspect of the present invention is to provide a system for surveillance of a predetermined environment having at least one wireless sensor capture device (SCD) and at least one input capture device (ICD) and a corresponding digital input recorder (DIR) for receiving, storing, editing, and/or retrieving stored input from the at least one SCD and the at least one ICD and controlling the ICD and SCD via wireless, remote communication therewith.

Another aspect of the present invention is to provide a system for surveillance of a predetermined environment having at least one wireless sensor capture device (SCD) and at least one wireless input capture device (ICD), in particular image-based or video input capture, and a corresponding digital input recorder (DIR) for receiving, storing, editing, and/or retrieving stored input from the at least one ICD and at least one SCD and controlling the ICD and SCD, and a remote server computer (RSC) for providing at least one authorized user remote, wireless access to the at least one ICD and SCD and DIR, where the ICD, SCD, DIR, and RSC are in wireless digital communication with each other and where the RSC may be accessed directly by the user or through a nework connection, such as the Internet.

Still another aspect of the present invention is to provide methods of using the system embodiments set forth herein, such as a method for locking communication between at least one wireless sensor capture device SCD(s), at least one wireless input capture device ICD(s) and a corresponding digital input recorder (DIR), including the steps of providing base system; at least one user accessing the DIR via user interface either directly or remotely; the DIR searching for signal from the ICD(s) and establishing communication with them; and locking the ICDs to send wireless data exclusively to that DIR; and/or the DIR locking itself for exclusive communication with the locked ICDs, and the ICD(s) searching for signal from the SCD(s) and establishing communication with them; and locking the SCDs to send wireless data exclusively to those ICD(s); and/or the ICD locking itself for exclusive communication with the locked SCDs, thereby providing a secure surveillance system for a target environment.

These and other aspects of the present invention will become apparent to those skilled in the art after a reading of the following description of the preferred embodiment when considered with the drawings.

DETAILED DESCRIPTION OF THE PREFERRED EMBODIMENTS

Figure 1:
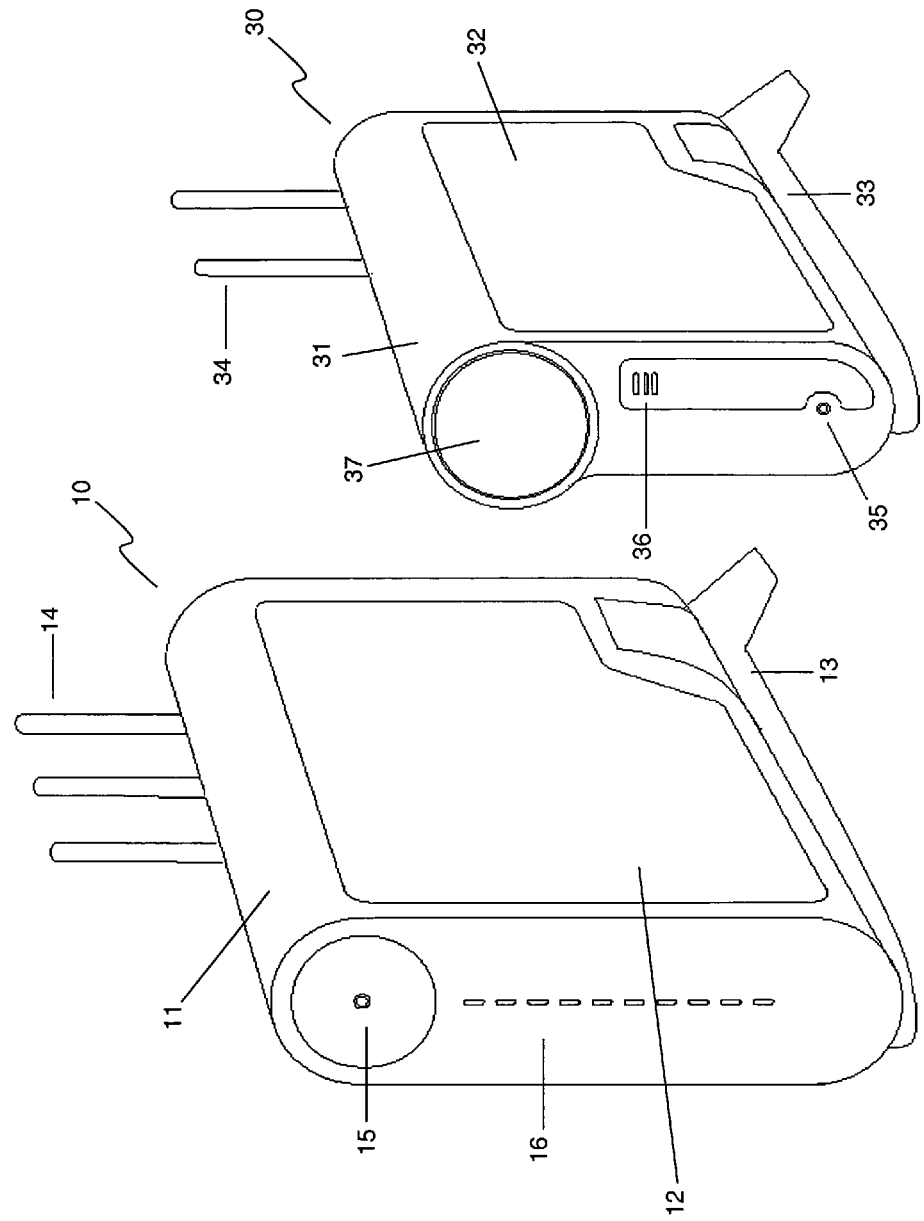
FIG. 1 is a perspective view of one embodiment of the input capture device (ICD) and digital input recorder (DIR) constructed according to the present invention.

In the following description, like reference characters designate like or corresponding parts throughout the several views. Also in the following description, it is to be understood that such terms as "forward," "rearward," "front," "back," "right," "left," "upwardly," "downwardly," and the like are words of convenience and are not to be construed as limiting terms.

Figure 2:
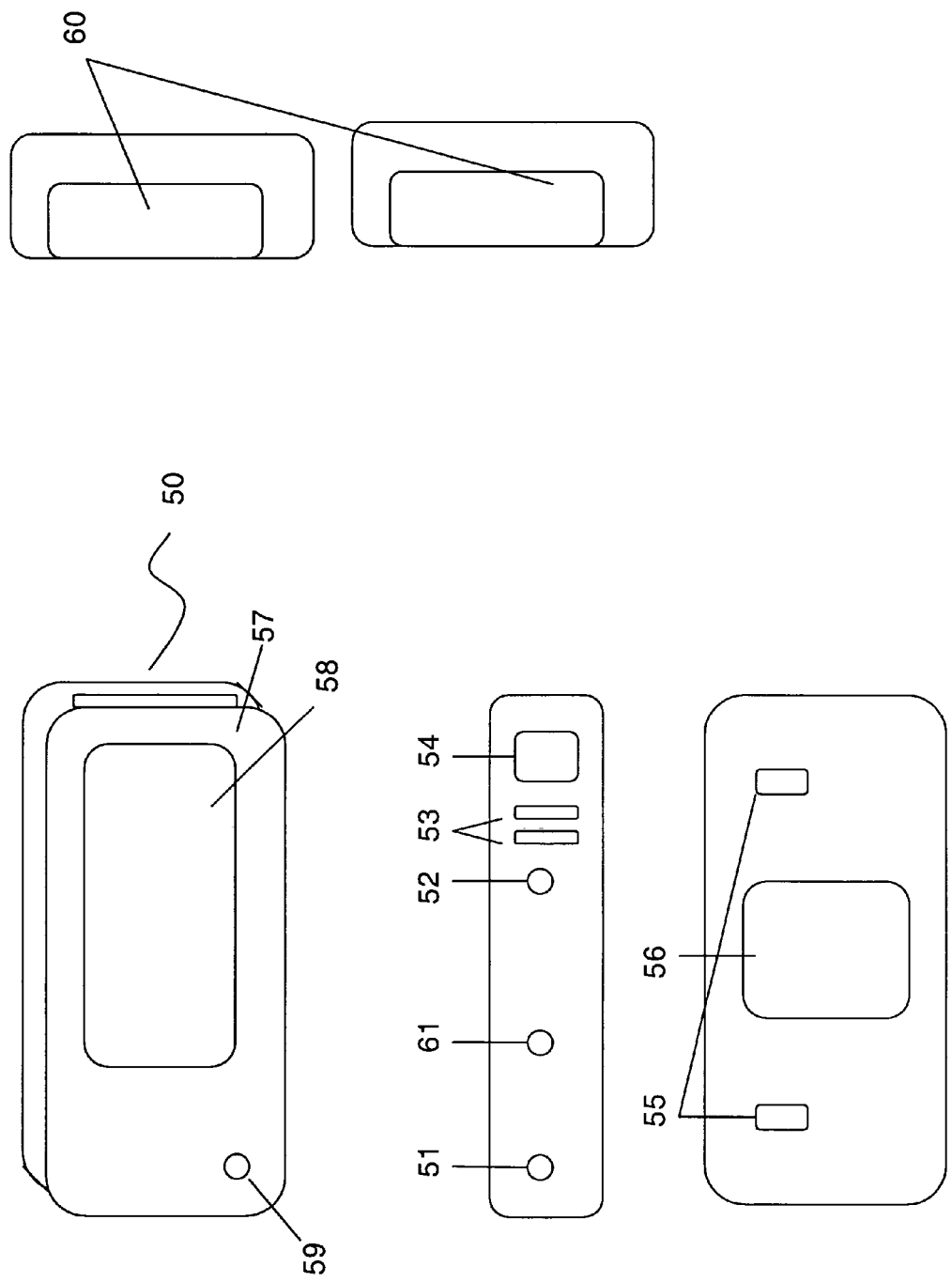
FIG. 2 is a perspective, bottom, sides, and back view of one embodiment of the sensor capture device (SCD) constructed according to the present invention.

Referring now to the drawings in general, the illustrations are for the purpose of describing a preferred embodiment of the invention and are not intended to limit the invention thereto. As best seen in FIG. 1 and 2, the three base elements of a system constructed according to the present invention are shown including a wireless input capture device, digital input recorder, (FIG. 1) and sensor capture device (FIG. 2).

FIG. 1 shows a perspective view of one embodiment constructed according to the present invention, showing an input capture device ("ICD"), generally referred to as 30, and a digital input recorder ("DIR"), generally referred to as 10, juxtapositioned. The DIR 10 has a plastic case 11 with a metal plate 12 affixed thereto and a removable tilt adjustable base 13 removably attached to the bottom of the DIR. Antennas 14, near the top of the DIR provide wireless communication for the present invention. A green power light emitting diode (LED) and button 15 is near the top of the DIR. The button 15 can turn on the motion detection and/or record all functions of the present invention. The status indicator LEDs 26 are placed on the front of the DIR and can illuminate either red or green.

Similarly, the ICD 30 has a plastic case 31 with a metal plate 32 affixed thereto and a removable tilt adjustable base 33 removably attached to the bottom of the ICD. Antennas 34, near the top of the ICD provide wireless communication for the present invention. A power/motion detection LED 35 is positioned near the bottom of the front of the ICD and can illuminate either red or green. A microphone 36 is also positioned on the front of the ICD to detect sound. The camera lens 37 is positioned near the top front of the ICD. Each of the ICD and DIR have a power supply, such as battery and/or connection for A/C connection to power supply.

FIG. 2 shows a perspective, bottom, sides, and back view of one embodiment constructed according to the present invention, showing an sensor capture device (SCD), generally referred to as 50. The SCD 50 has a plastic case 57 with a sensor area 58 on the front and sensor areas 60 on the left and right sides. A status LED light 59 is on the front. The bottom of the SCD shows power input 51, data input 52, two USB connectors 53, an Ethernet connector 54, and an optional directional antenna input 61. The back of the SCD shows a power supply, namely a battery compartment 56 and the wall mounting connectors 55.

Figure 3:
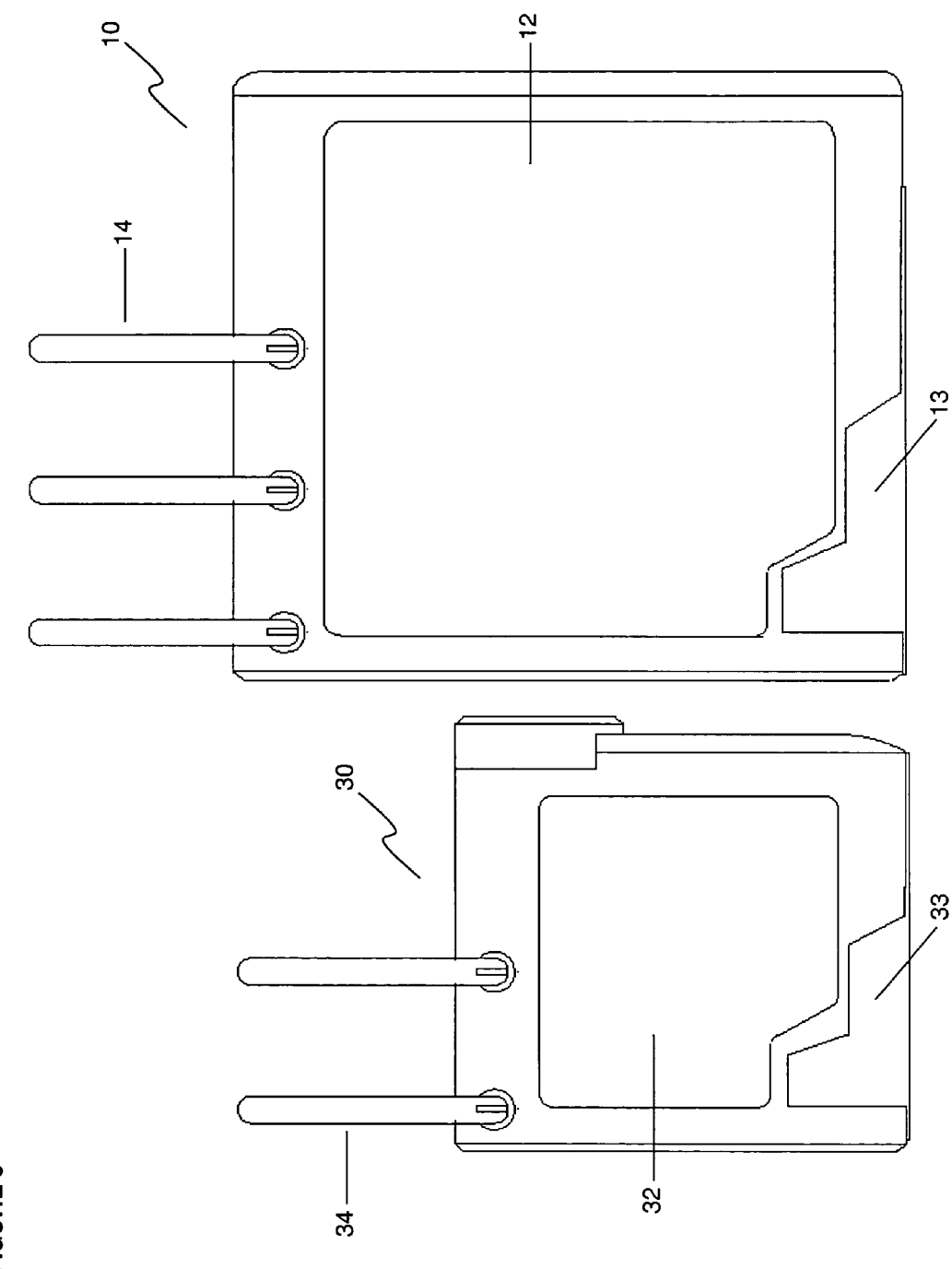
FIG. 3 is a front view of the embodiment of the ICD and DIR shown in FIG. 1.

FIG. 3 shows a side view of the embodiment shown in FIG. 1, showing an ICD 30 and a DIR 10 juxtapositioned.

Figure 4:
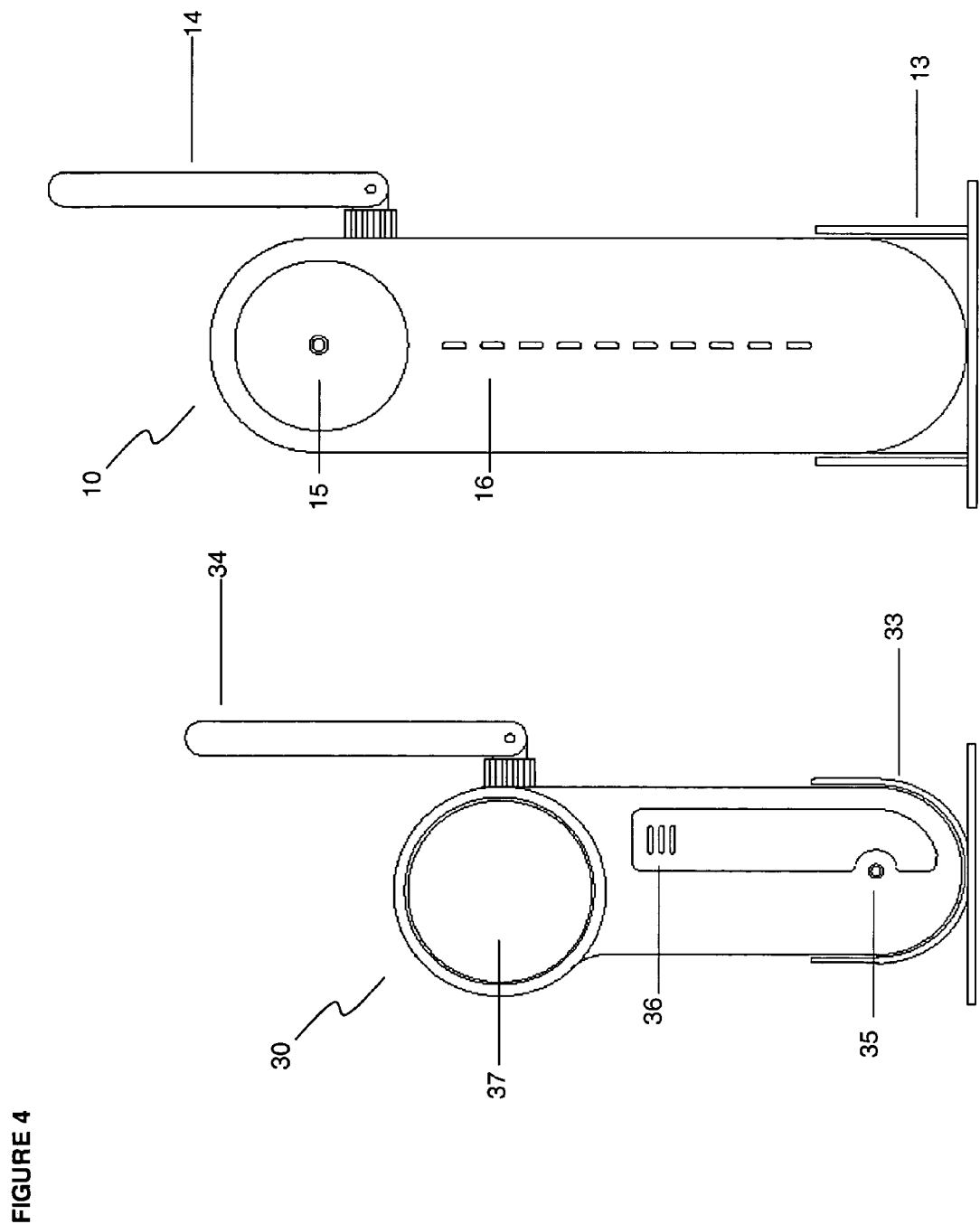
FIG. 4 is a back view of the ICD and DIR embodiment shown in FIG. 1.

FIG. 4 shows a front view of the embodiment shown in FIG. 1, showing an ICD 30 and a DIR 10 juxtapositioned.

Figure 5:
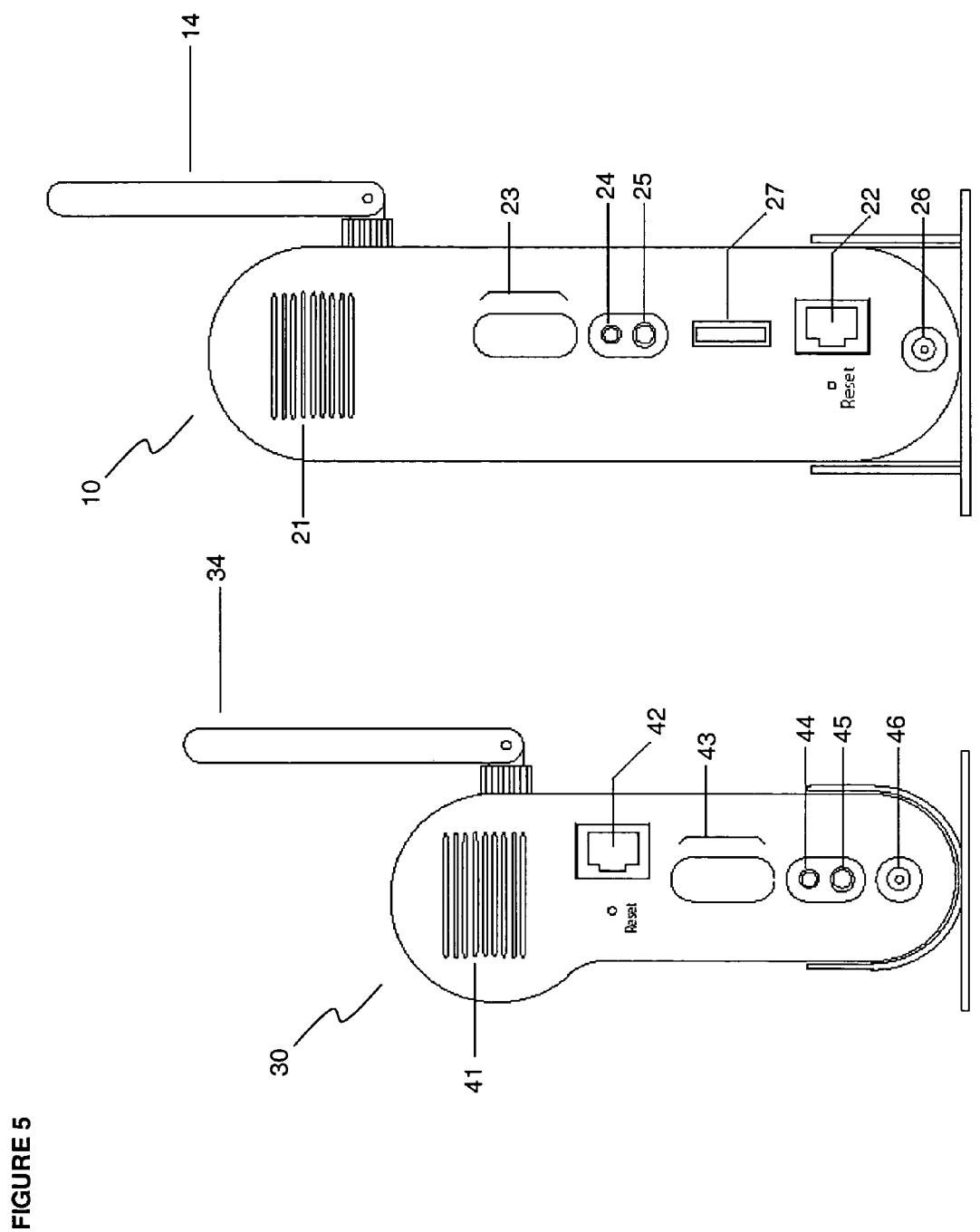
FIG. 5 is a top view of the ICD and DIR embodiment shown in FIG. 1.

FIG. 5 shows a back view of the embodiment shown in FIG. 1, showing an ICD 30 and a DIR 10 juxtapositioned. The ICD 30 has air vents 41 to facilitate cooling of the device. FIG. 4 also illustrates the various ports that are available on the two devices. The ICD 30 has the following ports: RJ-45 42; Alarm I/O Out 43; Microphone In 44; RCA Video Out 45; and DC In 46.

Similarly, the DIR 10 has air vents 21 to facilitate cooling. Some of the ports may differ between the ICD and DIR. The DIR 10 has the following ports: RJ-45 22; Alarm I/O Out 23; Audio Out 24; RCA Video Out 25; DC In 26; and USB 27.

Figure 6:
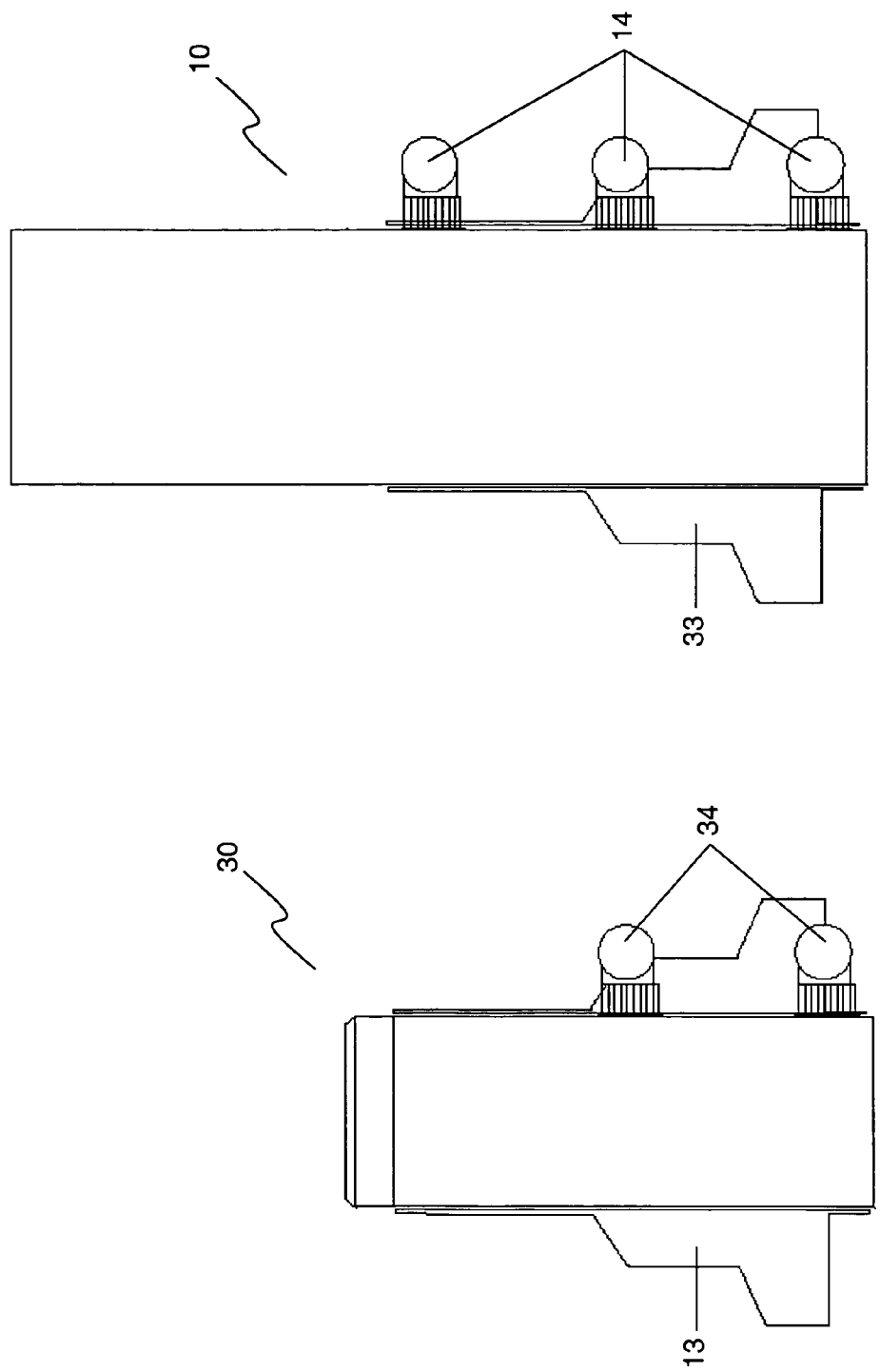
FIG. 6 is a bottom view of the ICD and DIR embodiment shown in FIG. 1.

FIG. 6 shows a top view of the embodiment shown in FIG. 1, showing an ICD 30 and a DIR 10 juxtapositioned. This demonstrates some possible footprints of the devices.

Figure 7:
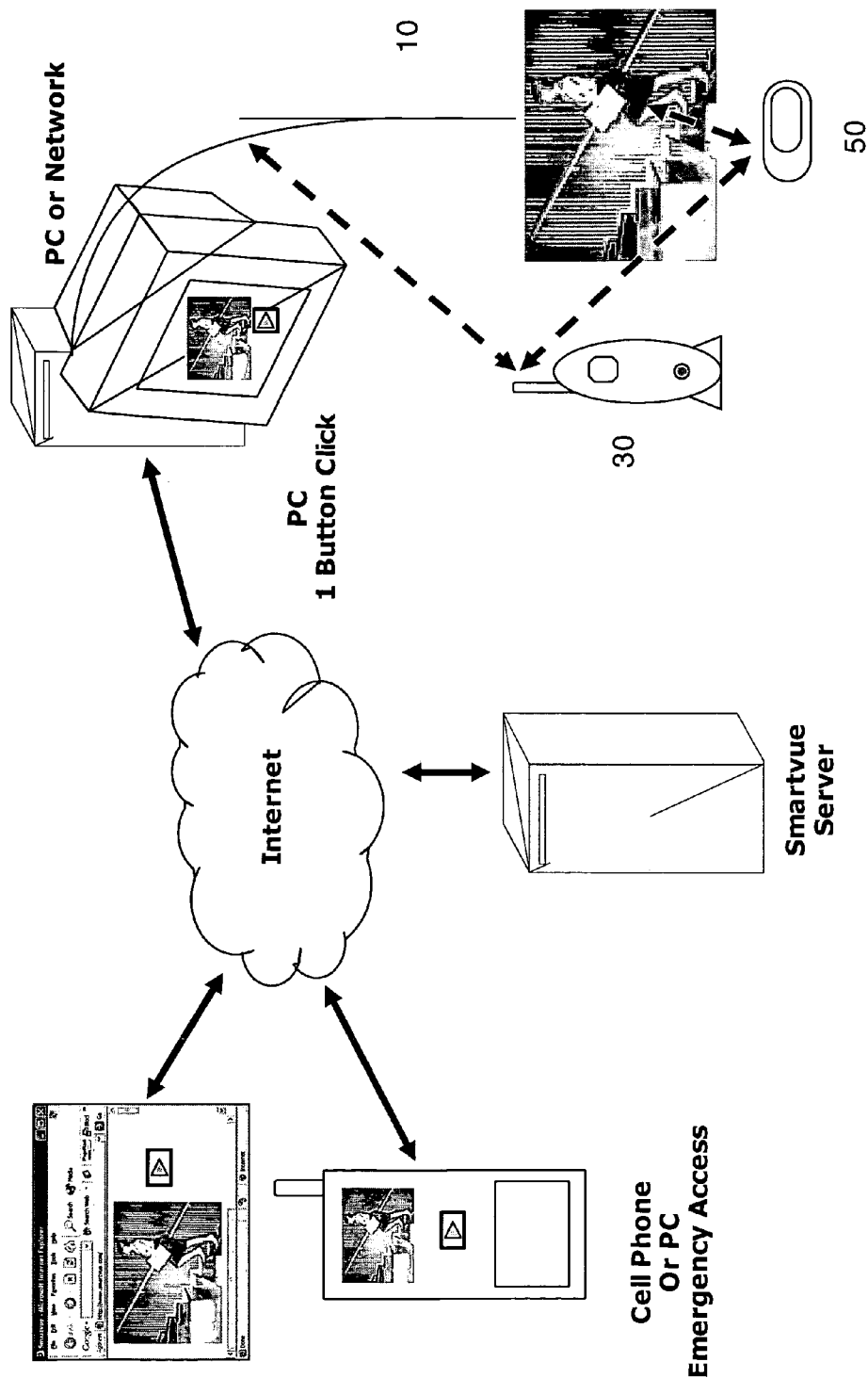
FIG. 7 is a schematic showing the interconnection of remote units of the system.

FIG. 7 shows a schematic showing the interconnection of remote units of the system.

Figure 8:
FIG. 8 is a user interface view of inputs to the system viewable by a user.

FIG. 8 shows a user interface view of inputs to the system viewable by a user.

Figure 9:
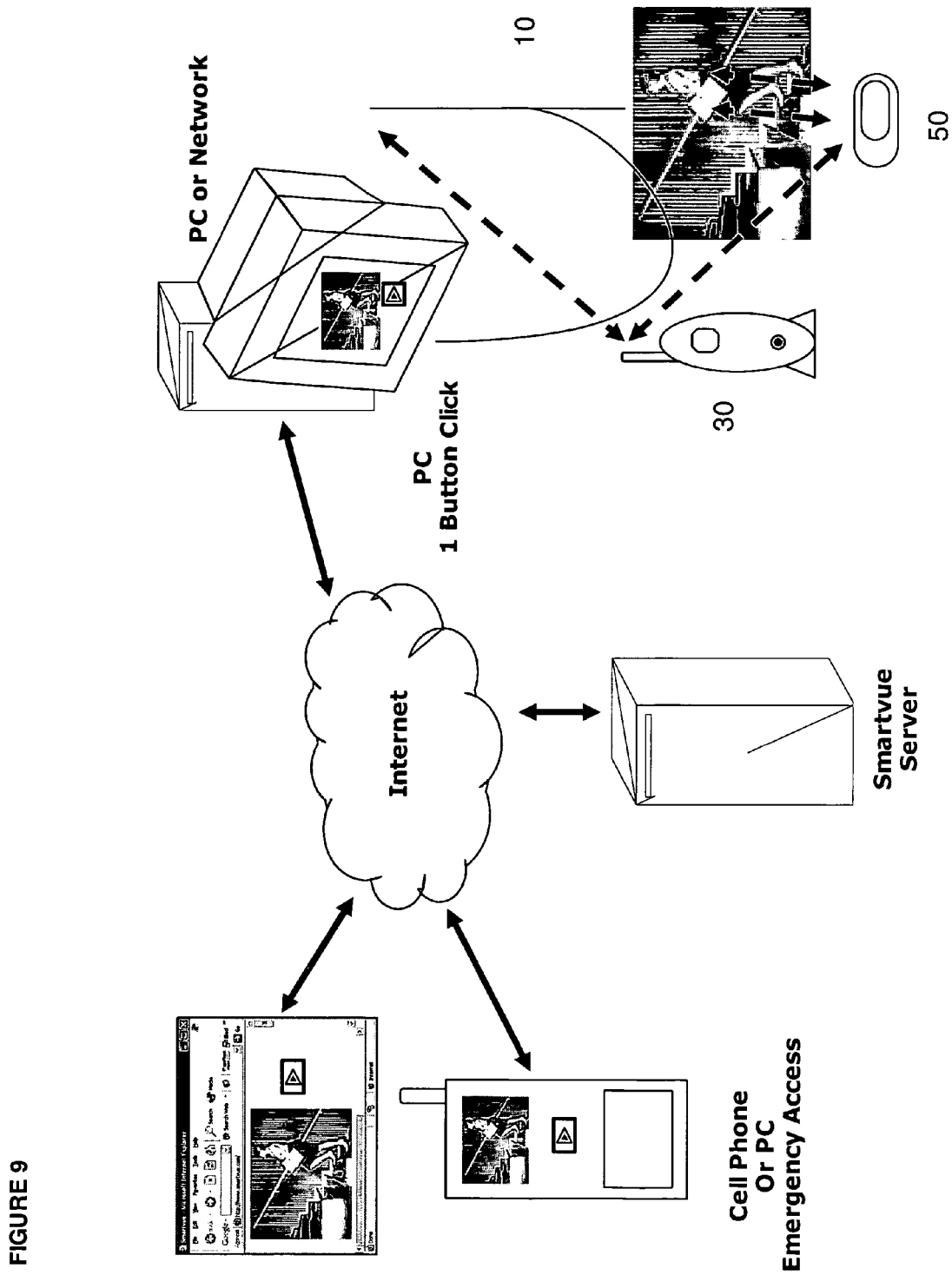
FIG. 9 is a schematic view of the system with remote interface options.

FIG. 9 shows a schematic view of one mesh networking scheme according to the present invention. In one embodiment, SCDs can communicate with each other to exchange RFID data that each SCD receives and then sends to an ICD. Based on rules that each ICD has, the ICD acts on the data received by the SCD. By way of example, if an SCD detects a person who has an RFID employee badge and carrying a laptop computer that has a RFID tag, the SCD will detect the person's badge RFID data and the computer's RFID data and send that data to the ICD. The ICD compares the data to a database to determine if that person has permission to be at a certain location and if that laptop computer belongs to that person or is allowed in that certain location based upon predetermined authorization criteria, which is input and modifiable by system controls. Furthermore, the system is also operable to track a person's movement. If a person appears with the incorrect RFID tag or no RFID tag, then an alarm can be sent to other ICDs and/or the DIR which can in turn communicate with the RSC to active input capture associated with the unauthorized person and his/her proximity and predetermined authorization and/or limitations to predetermined locations.

The wireless surveillance system according to the present invention includes at least one wireless sensor capture device (SCD) and at lease one input capture device (ICD) for sensing, capturing and transmitting surveillance and RFID and other sensor inputs from a predetermined input capture location, and a digital input recorder device (DIR) for receiving the surveillance inputs from the at least one wireless ICD and storing those inputs, which are capable of being reviewed by a system user on a controller/server computer, wherein the server computer is optionally used for communication with the ICDs and DIRs. In one embodiment of the present invention, the at least one SCD, at least one ICD and corresponding DIR device are used to form the system without requiring a separate server computer. The DIR itself has full capabilities when arranged for communication wirelessly with ICDs and for the ICDs to communicate wirelessly with the SCDs for recording and controlling inputs to the system, as well as settings for each of the at least one ICD, including activation of each. The ICDs are preferably operable as smart sensors, having internal processors, memory, and any components necessary to function similarly to DIRs, i.e., ICDs can cross-communicate and function as DIRs in system embodiments where a separate DIR device is not used Sensor Capture Device(s) (SCDs)

On the front end of the system, the wireless SCD can be run by the internal battery or external power source. Preferably, while the SCD is wireless, it further includes optional network, input jack, and USB connections on the bottom side of the SCD also, so it can be hardwired into a network and accept optional sensor inputs.

The SCD also includes at least one radio frequency identification (RFID) sensor and at least one input component for detecting and recording inputs, a processor, a memory, a transmitter/receiver, and optionally, at least indicator light for indicating camera activities, all constructed and configured in electronic connection. By way of example and not limitation, the at least one input component may include a RFID reader. In one preferred embodiment of the present invention, the wireless SCD includes internal antennas for providing a wireless signal for receiving and/or transmitting data with an ICD device or another SCD(s). The SCDs are operable for cross-communication with each other, including data exchange, wherein the data exchange includes information about the surveillance environment, settings, inputs, and combinations thereof. SCD adjustments and settings via manual controls are preferably optional, and are not usually required in preferred embodiments of the present invention, as the ICD device automatically establishes and controls the SCD settings and activities for each of the SCDs associated with the particular ICD device.

For the preferred embodiments where the SCD includes a RFID reader and corresponding components which will capture data on command from the wireless ICD associated therewith. The SCD including capable of capturing data from RFID or other data or sensor sources, such as, by way of example and not limitation, heart rate and health data from patients in a hospital or data from packages in a warehouse or in an office.

While SCDs are preferably used for indoor applications, waterproofing and weather proofing housing units and other components for sealing the housing against water and weather are used for outdoor applications of the present invention to make it operable in non-protected outdoor conditions. By way of example, sealed or gasketed casing, weatherproof venting and fan components to prevent water blowing into or being sucked into the case, are used for outdoor SCD units.

The ICDs of the present invention are capable of detecting data from commonly or commercially available RFID tags. The SCD is capable of capturing data, which is compressible into a data stream, and transmittable wirelessly to the ICD device, with the SCD data or other input data, such as temperature, humidity, chemical presence, radiation, and other input data, and combinations thereof, depending upon the sensors and intake means of each ICD, being combinable and/or integratable with the SCD data stream.

The at least one indicator is included with the ICD to indicate that the power is "on", and to indicate that RFID data is being detected. The indicator is activatable and operable when RFID is detected in a predetermined area and/or in a predetermined level or intensity within the environment or at predetermined dates or times.

Each of the at least one SCDs is constructed for a configuration that is operable in wireless communication (2-way) with the corresponding ICD and/or any other SCD(s), which when configured provide a complete system for wireless electronic sensor surveillance of an environment. In a preferred embodiment of the present invention, the SCDs are provided with Zigbee wireless capability. Other wireless communication may be provided instead of Zigbee.

One additional function that is optionally provided is night vision for SCD input capture, preferably provided using an infrared (IR) light source and sensor, so that the sensor may be effective in low- to no-light conditions.

The SCD further includes at least one chip that makes the device an intelligent appliance, permitting functions to be performed by the SCD itself without requiring software installation or the ICD, including but not limited to sensor and input controls, such as SCD sensitivity and communication with other SCDs. The SCD also includes a radio frequency transmitter and sensor to read information about an environment even in zero light. Preferred embodiments of this option include technology from CANESTA CORPORATION.

The SCD further includes a stand to support the device; the stand may be included with, integral with, or attached to the housing. The stand is constructed and configured to be mountable to a wall, suspend from ceiling, and provide a variety of stable positions for the SCD to capture as much data from a given environment as appropriate, given the space, conditions, and input capture type desired. Importantly, the stand serves as a stable base to tilt the SCD for direction up and down, and/or side to side. The stand is preferably movable between positions but is operable to retain a fixed position by a predetermined friction to ensure so that the SCD stays in place wherever the positioning was last stopped. The base and stand of the SCD is constructed such that it does not require mounting to a surface to provide stability. The adjustability and mobility of the device are significant features of the present invention to ensure easy setup.

Furthermore, the stand is preferably weight balanced for good center of gravity to support the adjustment on the stand for stability on the entire range of motion for the SCD on its stand; since motion of the SCD is adjustable and provides for dynamic range of motion when the SCD is in use, the stand construction enables remote modification of settings without requiring the user of the system to readjust or optimize the SCD positioning in person.

The SCD preferably is constructed and configured for a range of coverage, which can vary depending upon the conditions and limitations of a particular target environment. In a preferred embodiment of the system, the SCD has a range of coverage with a target range of at least up to 250 ft. The SCDs are capable of having a range of up to 1,000 meters, with an active wireless range from 1-1000 ft linear feet indoors, and preferably greater. Advantageously, the SCD can be configured and activated quickly for quick start up of a sensor surveillance system in the target environment. Additionally, the SCDs have the ability to communicate with one another to act as a data repeater and extend the usable wireless range to 3,000 meters and more.

Significantly, no adjustments to camera SCD, are required after installation; SCD settings are preadjusted and further controllable remotely by the ICD, DIR, and/or RSC and/or other SCD(s). By contrast, in the prior art, adjustments are usually always required for sensors following installation. Preprogrammed settings may be provided, with automatic and remote adjustment capabilities.

The SCD also includes at least one and preferably two internal antenna, which may be substituted for a unidirectional antenna using the optional antenna input.

The SCD and ICD have an optional network connection located at the back side of the device, so the devices can be hardwired into the network, if appropriate, for non-wireless operation and communication; however, wireless connections are preferred embodiments for the system and methods of the present invention.

Additionally, the SCDs have inputs, such as, by way of example and not limitation, USB and ethernet, and at least one indicator light or LED, and combinations thereof.

Additionally, the SCDs are operable to communicate with one another to exchange data about the environment and all control settings and other settings of any other SCDs without requiring manual adjustment or controls.

Input Capture Device(s) (ICDs)

The wireless ICD includes a power source, a power converter; soft power down component which provides for a gentle power down so that ICD settings are preserved and not lost. Preferably, while the ICD is wireless, it further includes an optional network connection at a back side of the ICD also, so it can be hardwired into a network.

The ICD also includes at least one sensor and at least one input component for detecting and recording inputs, a processor, a memory, a transmitter/receiver, and optionally, at least indicator light for indicating camera activities, all constructed and configured in electronic connection. It also includes at least two wireless communication systems, one to communicate bi-directionally with other ICDs and DIRs and the other to communicate bi-directionally with SCDs. By way of example and not limitation, the at least one input component may include a microphone, and/or a camera. In one preferred embodiment of the present invention, the at least one wireless ICD includes two antennas for providing a wireless signal for receiving and/or transmitting data with the DIR device or another ICD(s) and at least one wireless antenna for providing a wireless signal for receiving and/or transmitting data with one or more SCD device(s). The ICDs are operable for cross-communication with each other, including data exchange, wherein the data exchange includes information about the surveillance environment, settings, inputs, and combinations thereof. The at least one wireless ICD further includes a housing having a removable casing around a lens to make lens adjustments or settings; ICD manual adjustments and settings are preferably optional, and are not usually required in preferred embodiments of the present invention, as the DIR device automatically establishes and controls the ICD settings and activities for each of the at least one wireless ICDs associated with the particular DIR device.

For the preferred embodiments where the ICD includes a digital video camera (DVC) having a lens and corresponding camera components, the camera further includes a wireless antenna for receiving data from and/or transmitting data to one or more SCDs and a computer chip providing for capabilities of performing video compression within the ICD itself. The ICD as a wireless digital video camera is capable of capturing data from SCD(s) and capturing video within its range within the surveillance environment and compressing the captured video into a data stream and matching that compressed video with the SCD data, the capture occurring at predetermined dates and times, during activity detection, and/or on command from the wireless SCD or DIR associated therewith. In the case of video, the images are adjustable to capture at different sizes, different frame rates, and/or to include the display of the name of the device (determined by the user and/or the system), the date, the time, and combinations thereof. The ICD including a DVC and SCD receiver and/or transmitter is capable of capturing data from the SCD and images that are combinable and/or integratable with the video data stream and/or compressible into an individual image data stream, all at predetermined dates and times, when activity such as motion or audio are detected, on command from the wireless DVR, or on command from the SCD or DIR, and combinations thereof. As with video capture, image capture is adjustable to capture at a range of different sizes, different frame rates, and/or to include the display of the name of the device, which is determined by the user and/or the system, the date, the time, and combinations thereof. A data stream of images and data stream of data from the SCD are transmittable wirelessly to the wireless DVR.

Similarly, where the at least one ICD has audio capabilities, the captured audio, which is combinable and/or integratable with other inputs captured by the ICD sensors, is compressible into an individual audio data stream, which is transmittable wirelessly to the DIR. The activity of audio ICD is activatable at predetermined dates and times, during activity detection, and/or on command from the wireless DIR associated therewith. The audio ICD is further adjustable to capture audio at different or variable rates.

Preferably, since the ICD generates heat during operation, the ICD housing includes a cooling system having a vent and a low noise cooling fan. Since the video components of ICDs generate heat that must be dissipated for optimal performance of the system, preferred embodiments of the present invention include housing units with components that operate at lower temperatures, i.e., which generate less heat during operation, and include housing units formed of materials that dissipate heat well, and may include a combination of materials, such as metals and synthetic plastics or composites. While ICDs are preferably used for indoor applications, waterproofing and weather proofing housing units and other components for sealing the housing against water and weather are used for outdoor applications of the present invention. By way of example, sealed or gasketed casing, weatherproof venting and fan components to prevent water blowing into or being sucked into the case, are used for outdoor ICD units.

Other components optional to the housing unit but preferred for ease of use of the system include a removable filter collar on a front end of the camera lens, which facilitates user access for changing the filter and/or to provide a different filter, such as a polarization filter or a specialty filter, for example, to reduce light input or camera aperture.

The ICDs of the present invention are capable of detecting motion, capturing video, detecting and/or capturing audio, providing at least one data stream capability, including video, compressed video, audio, and combinations thereof. The at least one ICD is capable of capturing video, which is compressible into a data stream, and transmittable wirelessly to the DIR device, with the ICD audio data or other input data, such as temperature, humidity, chemical presence, radiation, and other input data, depending upon the sensors and intake means of each ICD, being combinable and/or integratable with the video data stream. Thus, while the ICDs each include at least one sensor for detection and at least one capture input means, preferably each of the ICDs include at least two sensors and input means for image and/or video, and audio capture. In a preferred embodiment, at least two sensor types are used, audio and image or video sensors. The at least one indicator is included with the ICD to indicate that the power is "on", and to indicate that motion and/or audio being detected. The indicator is activatable when motion and/or audio is detected in a predetermined area and/or in a predetermined amount within the environment.

Each of the at least one ICDs is constructed for configuration that is capable of wireless communication (2-way) with the corresponding DIR device and/or any other ICD(s), which when configured provide a system for wireless electronic surveillance of an environment. In a preferred embodiment of the present invention, the ICDs are provided with multiple input multiple output (MIMO) wireless capability. Other wireless communication may be provided instead of MIMO.

Night vision for ICD video input capture may be provided using an infrared (IR) light source, so that the video recorded may be effective in low- to no-light conditions. Image or video input capture may be provided in a range of resolution, in black/white, in color, and sized based upon inputs from the DIR device and/or controller/server computer by an authorized user of the system, and are modifiable after setup of the system by modifying controls remotely, and/or by modifying hardware.

The ICD further includes at least one chip that makes the device an intelligent appliance, permitting functions to be performed by the ICD itself without requiring software installation or the DIR, including but not limited to sensor and input controls, such as camera digital zoom, pan left and right, tilt up and down; image or video brightness, contrast, saturation, resolution, size, motion and audio detection settings, recording settings, communication with other ICDs; and single chip video compression (single DSP). The ICD also includes a sensor with ability for high dynamic range for inputs. Preferred embodiments of a system according to the present invention includes video technology commercially provided by PIXIM, and set forth under U.S. Pat. Nos. 6,791,611; 6,788,237; 6,778,212; 6,765,619; 6,737,626; 6,726,103; 6,693,575; 6,680,748; 6,665,012; 6,552,746; 6,545,258; 6,542,189; 6,518,909; 6,507,083; 6,498,576; 6,498,336; 6,452,152; 6,380,880; and 6,310,571.

The ICD further includes a stand to support the device; the stand may be included with, integral with, or attached to the housing. The stand is constructed and configured to be mountable to a wall, suspend from ceiling, and provide a variety of stable positions for the ICD to capture as much data from a given environment as appropriate, given the space, conditions, and input capture type desired. Importantly, the stand serves as a stable base to tilt the ICD for camera direction up and down, and/or side to side. The stand is movable between positions but retains a fixed position by a predetermined friction to ensure so that the ICD stays in place wherever the positioning was last stopped. The base and stand of the ICD is constructed such that it does not require mounting to a surface to provide stability. The adjustability and mobility of the device are significant features of the present invention to ensure optimal surveillance and easy setup.

Furthermore, the stand is weight balanced for good center of gravity to support the adjustment on the stand for stability on the entire range of motion for the ICD on its stand; since motion of the ICD is adjustable and provides for dynamic range of motion when the ICD is in use, the stand construction enables remote modification of settings without requiring the user of the system to readjust or optimize the ICD positioning in person.

The ICD preferably is constructed and configured for a range of coverage, which can vary depending upon the conditions and limitations of a particular target environment. In a preferred embodiment of the system, the ICD has a range of coverage with a target range of at least up to 250 ft. The ICDs are capable of having a range of up to 300 meters, with an active wireless range from 1-1000 ft linear feet indoors, and preferably greater. Advantageously, the ICD can be configured and activated quickly for quick start up of a surveillance system in the target environment. Additionally, the ICDs have the ability to communicate with one another to act as a data repeater and extend the usable wireless range to 3,000 meters and more.

Significantly, no manual adjustments to camera settings, such as focus and focal length, are required after camera installation; ICD settings are preadjusted and further controllable remotely by the DIR and/or RSC and/or other ICD(s). By contrast, in the prior art, manual or physical adjustments are usually always required for surveillance cameras following installation. Preprogrammed settings may be provided, with automatic and remote adjustment capabilities. Where the ICD is a video camera, the settings may include focus, resolution, etc.

Each of the at least one ICD is constructed to optimally reduce heat from particular heat-generating components. In a preferred embodiment of the present invention, the ICD includes a plastic case with metal sides to reduce heat while the system is running. Also, a back plate of the ICD or camera is all metal to increase heat dissipation, and to optimize weight and heat management, which important where there is a lot of power involved, as with wireless video input devices. Also, significantly, the ICDs and/or DIR devices are constructed with a separate chamber for imaging components to reduce heat. It is known that heat is not good for imaging sensors or equipment; however, cooling fans can generate noise, which is preferably minimized with security systems and components therein. The camera is configured to communicate with an imaging board with a flexible electronics communication cable, which permits the camera to have a separate chamber for optimized heat reduction. This is a problem specific to wireless cameras that has not been successfully addressed in the prior art.

The ICD also includes at least one and preferably two antenna that are removable, including standard antennae, which may be substituted for a patch antenna and/or a long range antenna.

The inputs captured by ICDs are provided to the DIR for which output for RCA viewing is available, such as connecting a monitor with a user interface for remote viewing of video from video cameras. In this case the setup easier because the remote user can see what the camera views from the monitor, which is removably connectable to the system. The ICD and DIR also have an optional network connection at the back side, so the devices can be hardwired into the network, if appropriate; however, wireless connections are preferred.

Additionally, the ICDs have inputs, such as video and microphone, and at least one indicator light. In the case of a wireless video camera, the housing includes an easily removable casing around the lens to make lens adjustments or settings, which optional, and not usually required.

Additionally, the ICDs have the ability to communicate with one another to exchange data about the environment and all control settings and other settings of any other ICDs.

Digital Input Recorder Device (DIR device)

The DIR is an optional component of the system where ICDs have smart microprocessing capabilities that enable data input capture, inputs processing and comparison with settings and/or reference data, and cross-communication with each other. However, where used, the wireless DIR device communicates directly with the at least one ICD, and, in embodiments where the controller/server is included in the system, the DIR device also communicates with the controller server to send data streams to the server and receive data or instruction from the controller/server to control its properties. In the case of a video camera for at least one ICD, the DIR may also be referred to as a digital video recorder device (DVR).

Surprisingly, compared with prior art surveillance systems, the DIR device and the smart ICDs function as appliances, which permits a rapid setup of the system. Significantly, since the DIR device operates as an appliance, there is no software installation involved in the basic system setup. The preferred embodiments of the present invention including at least one ICD and a corresponding DIR device permit for setup and recordation of inputs to the system from the observation or surveillance environment with one click activation by the user/installer, generally in less than ten minutes from start to finish. Such rapid setup, including installation and activation to recording of the system, is not possible with prior art systems, given their complex components, interactivity via transmission lines, and/or software installations, which typically require an expert or trained specialist to ensure proper setup, installation, activation, and testing of the system prior to ongoing operation. By sharp contrast, the preferred embodiments of the present invention provide for one click activation for receiving and recording inputs to the at least one wireless ICD, i.e., for activating the ICD capability to record designated dates and times, when a surveillance event, a motion event or an audio event is detected by at least one of the at least one ICDs in the system, immediately after the rapid setup is complete.

Furthermore, the system provides for rapid settings adjustment, including settings for sensitivity of ICD motion and audio detection; preferably, the settings adjustment is made by the user through the DIR device. The user simply sets a surveillance area for observation and data capture by each ICD of the at least one wireless ICD; for video capture, using an ICD with a digital camera, the camera may be set to focus on a predetermined location within the area, such as a window, a door, and the like. While the settings are practically a function of the ICD itself, the DIR device, which is also wireless, functions to control the settings of each of the corresponding ICDs associated with that DIR device. Other functions performed by the DIR device include, but are not limited to printing, saving or storing recorded inputs from the ICDs, transferring data to a removable storage device, such as a USB storage key device.

Also, a power supply and a soft power down function is provided, similar to the ICD soft power down, to preserve the settings of the DIR device in the event of power termination to the device.

The DIR is capable of running software for managing input from the at least one wireless ICD associated with or corresponding to a particular DIR device after installation. With the software, the DIR is capable of intaking and managing up to 10 data streams simultaneously; allowing the user to control the ICD unit, including allowing the user to zoom, pan, and tilt the camera, as well as managing microphone sensitivity. Sensitivity controls for other ICD input means, such as heat or temperature, chemical substance presence, radiation detection, and the like may be controlled remotely from the wireless DIR device as well. Other DIR device control functions for controlling the ICDs include but are not limited to controlling brightness, contrast, color saturation, where images and video are involved.

Other software-based functions capable of being performed by the DIR include sending text message, sending still image, sending email or other communication to a user on a remote communications device; usually, these functions are programmed to occur upon the occurrence of an event. DIR data recordation and storage overwrite may be based on settings that enable newer data to overwrite older data. Additionally, the DIR may be programmed to include overwrite protection to prevent overwriting of event video, audio, or other input data captured by the ICD and transmitted to the DIR device. Preferably, the DIR includes capabilities of data search and display, data archiving to external device, network, computer, server, and combinations thereof, data printing, data exporting, data deletion, data playback, and combinations thereof. Data playback includes play, fast forward, rewind or reverse, frame by frame step forward or backward, pause, and combinations thereof.

In a preferred embodiment of the present invention, the system includes a DIR device running software that is capable of automatically upgrading its own software, which eliminates user maintenance, upgrading, or other activity to optimize system performance.

The DIR's capabilities of adjusting settings and/or controls for the at least one ICDs includes any functions of the ICDs, including but not limited to zoom pan and tilt, color brightness, contrast, saturation, sharpness, frame rate, video and/or image size, audio rate, wireless control data, encryption and security data, set motion and/or audio detection area and/or levels, set recording, set triggers, record on command, and combinations thereof.

The DIR is preferably capable of connecting directly to a computer or a computer network, more specifically connecting to a personal computer via a USB or similar connection and to a network using a network cable or similar connector, with the DIR interface being accessible after such connection through a user interface or a web browser, respectively; and capable of sending data and/or alert or warning to a cell phone or computer via a signal or message such as by voice or email.

Also, the DIR is capable of performing a backup of the ICD inputs, including video, to a network, a personal computer (PC), computer readable medium (CRM) or other storage device. The DIR may be programmed to lock to predetermined ICDs having cameras, to maintain integrity of camera signal to DIR device.

In a preferred embodiment of the present invention, the user interface of the ICD inputs on the DIR device include at least one visual cue on the video to tell whether video is being recorded, e.g., a red and/or green dot is shown on the image. Also, preferably, the DIR device has a front with indicator lights that match or correspond to these same visual cues. For quality checking purposes, similarities such as these provide ease of use for the system user to confirm system functionality upon inspection.

The DIR device is programmable for wireless communication with input capture device, including both transmitting data, settings, controlling instructions and receiving input captured from the ICD, like images, video, audio, temperature, humidity, chemical presence, radiation, and the like. Thus, the DIR device is capable of receiving wireless data from the wireless input capture device(s), indicating which of the ICDs is active, recording data and storing data, searching through recorded data, transmitting data and instructions to the ICD, adjusting ICD settings and/or controls, communicating with the controller/server computer to send and/or receive data, and other functions, depending upon the specifications of the system setup, the environment under surveillance, and whether or not remote access is used via the controller/server computer and Internet.

The DIR device's data recordation and storage capability permit inputs from a multiplicity of ICDs to be associated with each DIR device to be singularly received, recorded, stored, and researched by a remote user from the ICDs. The user can search historically recorded data by date, time, event type, or any other means of selecting a setting or event corresponding to the each or any of the ICDs and the environment under surveillance by the system. Each of the ICDs is capable of individualized settings control by a single DIR device; a multiplicity of DIR devices may be controlled and managed by the controller/server, either within a given surveillance environment or in different locations.

Other components of the DIR device include, but are not limited to having a base that may be optionally adjustable for optimized mounting on a surface; having a long range MIMO wireless component; having a one-chip video compression component for resizing video data, recompressing it, and streaming it; having a USB port connectable to a computer, or for storage key, or removable hard drive for data storage; having an ethernet port to connect to a network; having RCA video output like the ICDs; having 2 or 3 USB ports for data output as well as for a USB based security key, having at least one antenna, preferably three antennae, which may be removable and replaceable; having a power control button on the housing; having a recessed reset button in the housing, accessible on the backside of the housing; having a low noise fan; having a hard drive for recording inputs; and/or having at least one, preferably a multiplicity of indicators, preferably light emitting diodes (LEDs), that are viewable by a user on the outside of the housing of the DIR device.

By way of example, in a preferred embodiment of the present invention, the DIR device has ten LEDs on the front of the housing, each of which correspond to an individual ICD. Significantly, these indicators, in particular as LEDs, provide content dense visual information with a quick glance from the user. There are five modes that represent ICD status, illustrated for one embodiment in the following table, Table 1:

| LED INDICATOR | CORRESPONDING STATUS |
|---|---|
| Off | ICD off |
| Green | ICD connected to DIR device |
| Flashing Green | DIR recording inputs from the ICD |
| Flashing Red | ICD detecting at least one event |
| Red | Error warning |

The error warning may be due to a variety of conditions, such as, by way of example and not limitation, lost connection between the ICD and DIR device, data loss, throughput reduction, etc.

The optional remote controller or server computer (RSC) runs software providing for remote access and control, and is separate from the wireless DIR and the ICDs. Users log in with a username and password from any Internet connected PC, web enabled cell phone, or other Internet enabled or network communicable device, to remotely access or review the wireless input or camera video and/or image(s). The user accesses the system through a user interface operating in connection with a web browser. The RSC communicates directly with the wireless DIR and enables users to remotely configure wireless DIR properties and the ICDs' properties, and, preferably to perform any of the functions that are directly performable for any DIR or ICD, such functions being set forth in the foregoing. The RSC may provide an electronic commerce function such as providing a user to pay for remote access service. The RSC provides an authorized user remote from the target surveillance environment the option of logging into the system, selecting any ICD for monitoring, e.g., select any camera input from any DIR, print, save, email image from the input, such as a video clip, and zoom, pan and tilt live video through the DIR, similar control and/or access activities, and combinations thereof.

The RSC functions as a remote monitoring station like a personal computer and is capable of providing a user interface that is accessible through a web browser; the RSC is thus any Internet connectable device, including computer, PDA, cell phone, watch, any network accessible device, and the like, which provides access for at least one remote user. The at least one remote user is preferably a predetermined, authorized user.

Users of the system are preferably authorized, whether access is direct or remote. Apart from direct access, authorization may also determine levels of access for each user. While all capabilities of the DIR and ICDs are controllable remotely, either by the DIR itself or by an Internet communicable device in communication with a server computer that communicates with the DIR(s), the number and type of devices may be limited based upon authorization level of a user.

The RSC provides for user remote access to live and/or recorded audio and/or video for any camera on any DVR; furthermore, control functions permit this user(s) to adjust and to make changes to any DVR or ICD settings remotely. Also, off-line archiving is operable via the user selecting to remotely record to the RSC.

DIR, ICD, and SCD Communication Locking

In one embodiment of the present invention, a method for locking communication between at least one wireless input capture device ICD(s), at least one wireless sensor capture device (SCD), and a corresponding digital input recorder (DIR) or other SCD(s), either one-way and/or two-way, is provided, including the steps of providing base system; at least one user accessing the DIR via user interface either directly or remotely; the DIR and/or ICD(s) searching for signal from the ICD(s) and SCD(s) and establishing communication with them; and locking the ICDs and SCD(s) to send wireless data exclusively to that DIR or ICD or SCD; and/or the DIR or ICD or SCD locking itself for exclusive communication with the locked ICD(s) or SCD(s), thereby providing a secure surveillance system for a target environment.

DIR Activation and ICD and SCD Searching

The ICD or SCD is activated when at least one user accesses the DIR software by either launching the software directly or launching the DIR device or by clicking on an activation or start button for triggering activity steps within the software and hardware system to activate communication including data exchange between predetermined DIRs and their corresponding selected ICD(s) and SCD(s). In a preferred embodiment of the present invention the at least one ICD and at least one SCD include a wireless digital camera and wireless RFID reader and where the corresponding DIR is a digital video recorder (DVR); however, one of ordinary skill in the art will appreciate that the functionality applies to a range of ICDs, SCDs, and corresponding DIRs, with or without video capabilities in each case. When any of these events occur, the DIR initiates checking for signals from prior configured capture devices. If the DIR starts without any prior configured capture devices, then the DIR automatically begins searching for wireless signals from capture devices. If the DIR starts with prior configured capture devices and the user wants to add additional devices, the user clicks on a search button, and the DIR begins searching for wireless signals from capture devices not already configured and communicating with the DIR.

Communication

In a preferred embodiment of the present invention, the DIR is operable to identify signal(s) from the at least one ICD corresponding thereto and the ICD is operable to identify signal(s) from at least one SCD corresponding thereto an the DIR automatically establishes communication with the identified capture devices and creates a named representation, such as an icon or image with a name that represents the active ICD and SCD. Also, the DIR is operable to create a named representation for each of the corresponding ICDs and SCDs associated with that DIR that are identified but not in active communication with the DIR at that time. The non-communication status of these devices is denoted in the representation, for example by at least one indicator having at least one status, as set forth in the foregoing (see, e.g., Table 1). Then, the wireless digital video camera as ICD is operable to send a still image to the DIR interface, where applicable, for the user to confirm identity of the ICD sending the image. Importantly, the smart cross-communication of the ICDs permits inputs processing, comparison, recording, and combinations thereof independently of the RSC or DIR. The user may rename the ICD at that time or at a subsequent time. Importantly, no additional user steps are required to establish the monitoring set-up. The DIR also represents the status of each SCD.

Validation/Communication Optimization

The DIR is further operable to validate the device approval status for communication with the specific DIR and optimizes the wireless signal to the DIR to ensure the greatest information throughput from the SCD to the ICD and from the ICD to the DIR.

Camera and Sensor Locking/Security Establishment

Preferably, security functionality is operable when a DIR automatically locks a specific ICD or SCD, such as to permit an ICD to send wireless data only to that specific DIR and automatically initiating security on the data stream and to permit an SCD to send wireless data only to that specified ICD. The security methods may include cryptographic methods such as digital signing, stream cipher encryption, block cipher encryption, and public key encryption or hardware based encryption in which each device has a hardware device for encryption included. By way of example and not limitation, WAP, 802.11i, AES, SSL, stream cipher, any other type of security protocol, and combinations thereof may be used.

DIR Locking

Any of the DIRs operable within the system and having at least one ICD and at least on SCD associated therewith are further operable to be locked to prevent setting changes or data manipulation from any device apart from the DIR with which each ICD and SCD are locked into communication. In one embodiment of the present invention having video capabilities, the DVR as DIR, upon confirming detection of all the signal(s) from ICD(s) and SCD(s) associated therewith, confirms the establishment of communication with each detected ICD and SCD, in particular wireless digital video camera and wireless RFID reader, and locks the DVR to only communicate with the found device(s), unless it receives instruction from the user to look for other signal(s). The DVR indicates such a locked status, for example, by displaying a lock indicator on the DVR and/or on the ICD or SCD to provide an external visual status indication that the ICD(s) or SCD(s) are locked and also sends a lock status signal to an entity outside the present system, such as to the RSC and/or an alarm system or security software. Once searching and locking is complete, the DVR will not accept signals from capture devices that are not locked to the DVR, unless directed to search for capture devices by the user by click-selecting the search button. Alternatively, the system can notify the user of new ICDs or SCDs that come into communication with the system during operation and/or after initial setup has occurred.

Camera or Sensor Removal

ICDs and SCDs may be removed from operation and/or operational communication or interaction with the system. To remove a capture device from the DIR system, the user click-selects from the user interface on an image and/or name that represents the capture device they want removed and then click-selects a single removal button. The DIR then removes that capture device from the system.

Smart Mesh Sensor Networking with Video Content Management

In one embodiment of the present invention, the system includes a smart mesh SCD networking with a video content management. The smart mesh SCD network of the system is operable to provide SCDs to communicate with each other and/or the wireless ICD to act as repeaters, i.e., an extension or repeat functional component, to extend the usable range of the system beyond the range of any individual SCD. This provides an extended signal transmission from a series of wirelessly interconnected SCDs to provide an effective range of sensor surveillance over a larger target environment that is a distance additive of the range of each of the individual SCDs communicating with each other and ICDs.

In another embodiment of the present invention, in particular wherein the system is operational with video capabilities, the system includes ICDs that are operable to communicate with each other and/or the wireless DIR to exchange data and/or control each other to ensure that important data from ICD inputs is recorded properly with the DIR. By way of example, a first SCD senses the RFID data of a person moving towards a second ICD and communicates instruction or directive to the first ICD which then passes the data on to the second ICD to be aware of the data sensed by the first SCD and to take appropriate action as programmed or set-up for that ICD, such as to record video of the person. The appropriate action may further include capturing and/or recording the inputs at an increased frame rate, an increased resolution, send alarms or alerts, and/or other action to ensure that the important data, in this case motion, is captured or recorded by the second ICD.

In another embodiment of the present invention, in particular wherein the system has video capabilities, the system includes SCDs that are operable to communicate with each other and/or the wireless ICDs to exchange data and/or control each other based on a set of rules created by the user. By way of example, a first SCD detects data on an object that is moving towards a second SCD; wherein the first SCD sends data to an ICD and that ICD has been programmed and/or set-up with a rule indicating that if a specific object (based on its RFID sensor data) moves from the first SCD to a second SCD, then an alarm must be made. The first or second ICD can send the alarm to the RSC as the ICDs can share rules with each other and receive data from multiple SCDs.

In another embodiment of the present invention, in particular wherein the system has RFID capabilities, the system includes SCDs that are operable to communicate with each other and/or the wireless ICD to exchange data. The SCDs and/or ICDs and/or DIR work together to become a content management network whereby the content data is managed. By way of example, in a room monitored by an SCD, a person walks into the room, leaves a computer, then picks up a box and leaves. The SCD could detect the following: (1) the RFID tag of the person's employee badge giving their identification and noting that they have entered this room; (2) the RFID tag of the computer and that this computer was brought into the room: and (3) the RFID tag of the box that was taken out of the room. In addition to the video of the event recorded by the ICD, the ICD could store the content data which was provided by the SCD of "a specific person walking into a specific environment, with a specific computer asset that is left in the room, and that a specific boxed asset has left the room and at what day and time this all occured." This content data can be shared with the DIR and/or other ICDs.

Additionally, microchip(s) within the SCD(s) provide intelligent input capture and learned pattern analysis, such as an SCD with capability to identifying or sensing the distance of an object in detail, comparing the input characteristics with referenced and/or learned information, labeling the sensed object based on a likely match in the referenced and/or learned information, communicating and/or referencing programmed data to determine if other action is required, and performing the required action, as appropriate. By way of example, an SCD senses a moving object within its target surveillance area, it measures the size and shape of the data, sends that data wirelessly to the ICD which compares the size and shape of the object with reference information to determine that the moving object is likely a person, checks rules or settings to determine whether sensing the presence of a person is a trigger event for indicating an alarm, and communicating the alarm and/or recording and transmitting the images associated with the moving object (person) to other ICD(s), the DVR, and/or the RSC. In another example, additional inputs such as RFID inputs from tagged objects, identification badges, and the like, may be inputted to the ICD(s) and compared with reference information or settings to activate (or not) a trigger event. Alternatively, the absence of an RFID transmitter on a moving object (person) or stationary object (unauthorized package or object) in a secure area including the target surveillance environment may also be operable to activate a trigger event or alarm, and/or activate other sensors, such as radiation, sound, chemical detection, and the like, and combinations thereof. By way of more detailed example, in the case of video surveillance, where a person enters the target environment under surveillance by the SCDs, and where the person has an employee badge with an RFID or other transmitting capability, either active or passive, embedded or incorporated therein/on, the SCD sends data to the ICS which identifies the RFID tag data and compares it with existing data or settings stored within the ICD(s). If the RFID tag data does not comport with permissions available for and associated with that ID tag, then the ICD(s) activates a trigger event, such as recording inputs including video, audio, and other data associated with the person detected by the SCD, such as, by way of example and not limitation, clothing color, direction of travel, mass, height, speed, whether the person is carrying anything, movement particulars like jerkiness or injury, and the like. The ICD(s) then cross-communicate to ensure that other ICDs are aware of the non-compliant detection by the first SCD so that they respond accordingly. If the trigger event is an alarm event, then the ICDs are operable to send notification directly to the DIR or through other ICDs to the DIR or RSC, such that corresponding alarm event actions occur, such as further third party notification and inputs recording as required or determined by settings or programming within the system. In preferred embodiments the SCDs are RFID sensors and the ICDs are digital video cameras operable to communicate wirelessly with each other, the DIR, and/or the RSC.

In another embodiment according to the present invention, the SCDs within the mesh network are further equipped with wireless communication transmitters, such as cellular phone transmitters or wide band cellular cards for providing cellular transmission/reception by each SCD, to provide each SCD with standalone capability to cross-communicate with each other to extend the effective surveillance area and/or to communicate with each other to transmit and receive information that is further transmitted via the Internet to the RSC. Furthermore, business models using such systems and components with this type of method of operation permit users to access the system and its inputs for monitoring after payment of a monthly service fee. If an authorized user has paid the monthly subscription charge or service fee, then the user may remotely access SCD inputs, including stored data, and can download the stored or recorded input data through the RSC and/or a device in electronic communication with the RSC.

Certain modifications and improvements will occur to those skilled in the art upon a reading of the foregoing description. All modifications and improvements have been deleted herein for the sake of conciseness and readability but are properly within the scope of the claims.

What is claimed is:

1. A method for providing communication in a surveillance system, the method steps comprising:
    providing a base system, the base system including:
    at least one sensor capture device (SCD(s));
    at least one input capture device (ICD(s)); and
    at least one digital input recorder (DIR(s)) or another ICD or SCD;
    wherein each of the SCD(s), ICD(s) and DIR(s) is housed in separate enclosures and includes at least one processor, at least one memory and at least one wireless communication system, all constructed and configured in electronic connection;
    wherein each of the SCD(s) and ICD(s) further comprises at least one sensor and at least one input component; and
    wherein each of the ICD(s) further comprises at least one additional wireless communication system;

the ICD(s) and SCD(s) engaging in smart, direct communication amongst and between each other;

wherein smart communication includes exchanging data through cross-communication and direct cross-control and responding to data exchange by changing input capture settings;

wherein the direct cross-control includes the direct exchange of set triggers and trigger events, settings, inputs and combinations thereof;

wherein direct communication occurs without transmitting the communication through a communications network, the Internet, or additional devices or hardware;

at least one user interface providing access to the DIR or the ICD(s) via a remote server computer (RSC);

the SCD(s) processing inputs and sending the processed inputs to the ICD(s);

the ICD(s) further processing the processed inputs based upon predetermined settings stored in the ICD memory; and the ICDs transmitting the processed inputs to the RSC;

thereby providing a secure, remote access surveillance system for a target environment.

2. A method for providing communication in a surveillance system, the method comprising the steps of:

providing a base system, the base system including:

at least two wireless input capture devices (ICDs);

at least two wireless sensor capture devices (SCDs);

wherein each of the ICDs and SCDs is housed separately and includes at least one of each of a sensor, an input component, a memory, a processor and a wireless communication system, all constructed and configured in electronic connection;

wherein each of the ICDs further includes at least another wireless communication system;

each of the ICDs wirelessly communicating with a remote server computer (RSC);

the ICDs engaging in smart, direct, cross-control and cross-communication with each other and direct communication and direct control between any of the ICD(s) and the SCD(s) that provides for data exchange including input data relating to the environment under surveillance, control settings, and inputs captured by the SCD(s);

wherein the direct, cross-control includes the direct exchange of set triggers and trigger events, settings, inputs and combinations thereof;

wherein smart communication comprises wireless, bi-directional control and response communication exchange, including the adjustment of input capture settings;

wherein direct communication between two distinct devices consists of those devices only;

thereby creating a self-contained data control and response communication exchange between ICDs and SCDs;

at least one user interface providing access to the at least one ICD through the RSC via a user interface;

thereby providing a secure wireless surveillance system for a target environment.

3. The method according to claim 2, wherein the base system further includes a wireless digital input recorder (DIR) operable for wireless communication with the ICDs.

4. The method according to claim 2, further including the step of locking the communication between the ICDs and the SCDs for securing exclusive transmission between selected and/or all devices which secures exclusive communication between the devices by the initiation of security protocols on the devices.

5. The method according to claim 2, further including the step of the SCDs directly transmitting inputs from one SCD to another SCD forming a mesh network of SCDs configured and operable to independently communicate with each other to provide a maximum extended range of a sensor surveillance area.

6. The method according to claim 2, wherein the ICDs and SCDs are accessible via a user interface either directly or remotely through the RSC(s).

7. A surveillance system for wireless communication between components comprising:

a base system including: at least two input capture devices (ICDs); and at least two sensor capture devices (SCDs);

a remote server computer (RSC) operable to transmit and receive information with the base system;

wherein each of the ICDs and SCDs is housed separately and includes at least one of each of a sensor, an input component, a microprocessor, a memory and a wireless communication system, all constructed and configured in electronic connection;

wherein the ICDs are further comprised of at least another wireless communication system;

wherein the ICDs and SCDs are operable for smart, direct, wireless cross-control and cross-communication of data including input data relating to the environment under surveillance, control settings, and inputs captured by the ICDs and SCDs with each other independent of the RSC for forming a mesh network of ICDs and SCDs operable to provide secure surveillance of a target environment;

wherein the direct, cross-control includes the direct exchange of set triggers and trigger events, settings, inputs and combinations thereof;

wherein smart communication comprises data exchange and alteration of input capture settings based upon applying predetermined rules to received data;

wherein direct communication occurs wirelessly between ICD(s) and SCD(s) without transmitting the communications through a communications network, the Internet, nor additional devices or hardware;

thereby creating a self-reliant data control and response communication exchange between ICDs and SCDs.

8. The system according to claim 7, wherein the SCDs are operable to directly transmit inputs from one SCD to other SCDs forming a mesh network of SCDs, which are configured and operable to independently communicate with each other to provide a maximum extended range of a surveillance area.

9. The system according to claim 8, wherein the range is between about 100 to about 3000 meters.

10. The system according to claim 7, wherein the ICDs are operable to compare inputs from SCDs to reference data for labeling a sensed object for further identification by the system.

11. The system according to claim 7, wherein the SCDs further include a cellular phone transmitter or wide band cellular card for providing cellular transmission by each SCD, to provide each SCD with standalone capability to cross-communicate with each other to extend the effective surveillance are and/or to communicate with each other to transmit and receive information that is further transmitted via the Internet to the RSC.

12. A surveillance system for wireless communication between components comprising:

a base system including:

at least two wireless input capture devices (ICDs);

at least two sensor capture devices (SCDs) operable to transmit and receive information with the ICDs and SCDs;

wherein the ICDs and SCDs are housed separately and include at least one of each of a sensor, an input component, a microprocessor, a memory and a wireless communication system, all constructed and configured in electronic connection;

wherein the ICDs further include at least another wireless communication system;

wherein the ICDs and SCDs are operable for smart, direct wireless cross-control and cross-communication with each other of data including input data relating to the environment under surveillance, control settings, and inputs captured by the ICDs and SCDs, and comprising responses to said inputs including changes to device settings, for forming a mesh network of ICDs and SCDs operable to provide secure surveillance of a target environment;

wherein the direct, cross-control includes the direct exchange of set triggers and trigger events, settings, inputs and combinations thereof;

wherein smart communication comprises data exchange and alteration of input capture settings based upon applying predetermined rules to received data; and wherein direct communication occurs wirelessly between ICD(s) and SCD(s) without transmitting the communications through a communications network, the Internet, nor additional devices or hardware.

13. The system of claim 12, further including a remote server computer (RSC) for permitting user(s) to access the system remotely for reviewing data, modifying controls, and adjusting settings.

14. The system according to claim 12, wherein the SCDs are operable to directly transmit inputs from one SCD to other SCDs forming a mesh network of SCDs, which are configured and operable to independently communicate with each other to provide a maximum extended range of a surveillance area.

15. The system according to claim 14, wherein the range is between about 100 to about 3000 meters.

16. The system according to claim 12, wherein the ICDs are operable to compare inputs from SCDs to reference data for labeling a sensed object for further identification by the system.

17. The system according to claim 12, wherein the SCDs further include a cellular phone transmitter or wide band cellular card for providing cellular transmission by each SCD, to provide each SCD with standalone capability to cross-communication with each other to extend the effective surveillance area and/or to communicate with each other to transmit and receive information.

18. The system of claim 17, further including a RSC in communication with the ICDs and SCDs via a network, wherein the information is further transmitted from the ICDs and/or SCDs via the Internet to the RSC.

* * * * *